(12) United States Patent
Koshimae et al.

(10) Patent No.: US 7,889,772 B2
(45) Date of Patent: Feb. 15, 2011

(54) LASER OSCILLATOR APPARATUS AND POWER SUPPLY APPARATUS THEREFOR, AND CONTROL METHOD THEREFOR

(75) Inventors: Toshiki Koshimae, Chiyoda-ku (JP); Toshiaki Watanabe, Chiyoda-ku (JP); Takeshi Morimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 12/282,811

(22) PCT Filed: Apr. 25, 2006

(86) PCT No.: PCT/JP2006/308602

§ 371 (c)(1),
(2), (4) Date: Jan. 9, 2009

(87) PCT Pub. No.: WO2007/129363

PCT Pub. Date: Nov. 15, 2007

(65) Prior Publication Data

US 2009/0207871 A1    Aug. 20, 2009

(51) Int. Cl.
*H01S 3/00* (2006.01)
(52) U.S. Cl. .............. 372/38.04; 372/29.011; 372/29.012; 372/29.021; 372/38.01; 372/38.07; 372/38.09
(58) Field of Classification Search ............ 372/29.011, 372/29.012, 29.021, 38.01, 38.04, 38.07, 372/38.09
See application file for complete search history.

(56) References Cited

U.S. PATENT DOCUMENTS 5,163,063 A * 11/1992 Yoshikawa et al. ....... 372/38.02
5,265,115 A    11/1993 Amano
5,499,257 A *  3/1996 Nagano et al. ............... 372/31

(Continued)

FOREIGN PATENT DOCUMENTS

EP    0 680 121 A1    11/1995

(Continued)

*Primary Examiner*—Minsun Harvey
*Assistant Examiner*—Yuanda Zhang
(74) *Attorney, Agent, or Firm*—Sughrue Mion, PLLC

(57) ABSTRACT

A laser output power command determination value from a controller (17) is input to an upper limit current determination unit (32), and an upper limit current value to be decided based on the laser output power command determination value is determined. Then, a second comparator (30) compares a command current value determined from the laser output power command determination value and a laser output power command determination value measured with a power monitor (13), with an upper limit current value determined with a upper limit current determination unit (32). The second comparator (30) determines a command current value when the upper limit current value is greater than the command current value and the upper limit current value when the command current value is greater than the upper limit current value, as a reference current value, by which reference current value a current to be supplied to pumping means is configured to be controlled. In such a configuration, an upper limit current value is determined according to a laser output power command determination value, whereby an increased current to be supplied to the pumping means, i.e., the increase of energy to be supplied to a laser oscillator apparatus is avoided, and an energy loss in the optical component is reduced, which prevents damage development from leading to the replacement of the component.

11 Claims, 11 Drawing Sheets

U.S. PATENT DOCUMENTS

| | | | |
|---|---|---|---|
| 5,638,389 A * | 6/1997 | Nagano et al. | 372/31 |
| 5,961,857 A | 10/1999 | Takahashi et al. | |
| 6,058,126 A | 5/2000 | Ishikawa et al. | |
| 6,137,816 A * | 10/2000 | Kinbara | 372/29.012 |
| 6,222,862 B1 * | 4/2001 | Kinbara et al. | 372/38.04 |
| 6,259,714 B1 * | 7/2001 | Kinbara | 372/38.02 |
| 6,330,258 B1 * | 12/2001 | Kawamura | 372/30 |
| 7,020,171 B2 * | 3/2006 | Koshimae et al. | 372/38.1 |
| 7,349,451 B2 * | 3/2008 | Nakayama et al. | 372/21 |
| 2005/0163174 A1 * | 7/2005 | Nakayama et al. | 372/22 |
| 2005/0201430 A1 | 9/2005 | Koshimae et al. | |

FOREIGN PATENT DOCUMENTS

| | | |
|---|---|---|
| JP | 61-209790 A | 9/1986 |
| JP | 63-250883 A | 10/1988 |
| JP | 5-110173 A | 4/1993 |
| JP | 5-198867 A | 8/1993 |
| JP | 9-246174 A | 9/1997 |
| JP | 11-26857 A | 1/1999 |
| JP | 11-162221 A | 6/1999 |
| JP | 11-214774 A | 8/1999 |
| JP | 2002-254186 A | 9/2002 |
| JP | 2003-224316 A | 8/2003 |
| JP | 2004-259751 A | 9/2004 |
| WO | 03/034555 A1 | 4/2003 |
| WO | 03/067722 A1 | 8/2003 |

* cited by examiner

FIG. 3a
| CURRENT VALUE (A) | LASER DIODE OUTPUT POWER (W) |
| --- | --- |
| 20 | 0 |
| 50 | 30 |
FIG. 3b
| CURRENT VALUE (A) | LASER DIODE OUTPUT POWER (W) |
| --- | --- |
| 20 | 10 |
| 50 | 40 |
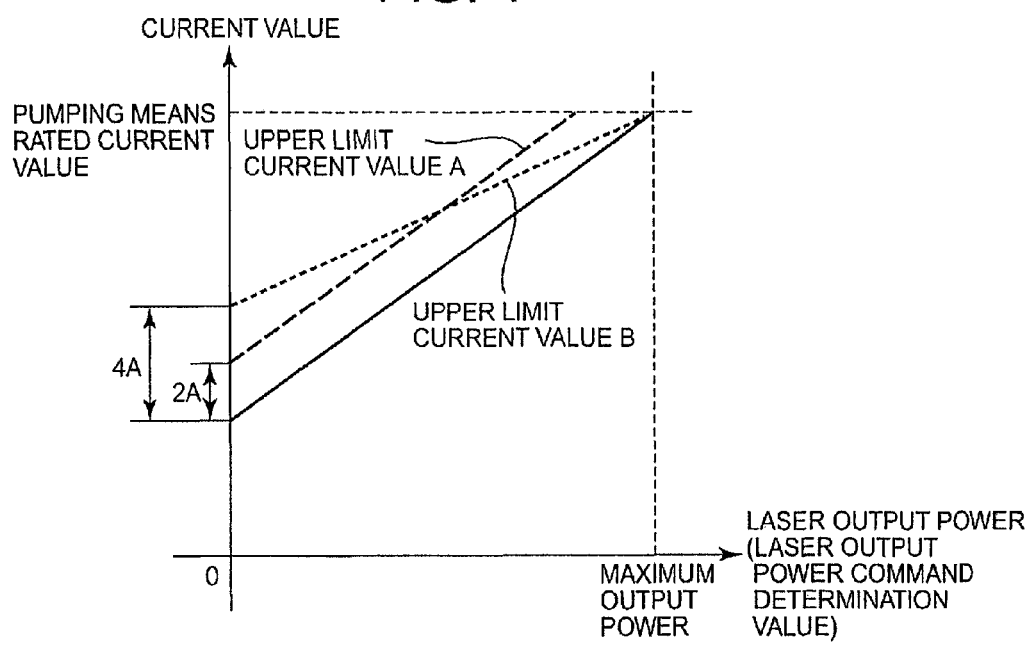
FIG. 4
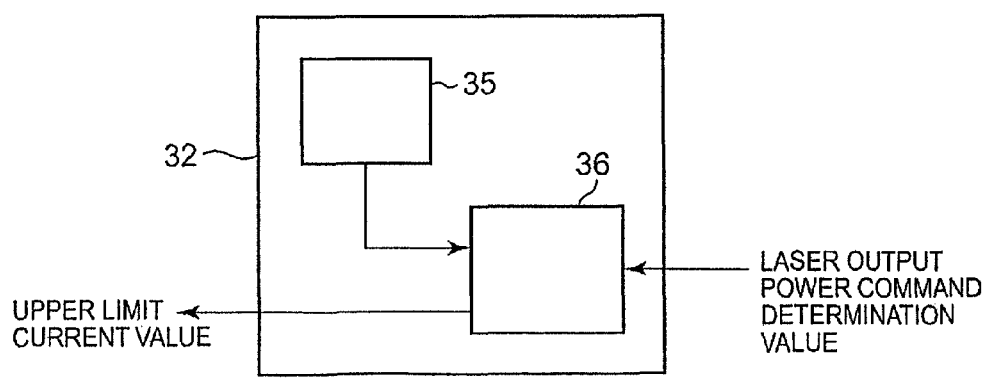
FIG. 5

| CURRENT VALUE (A) | LASER OUTPUT POWER (W) |
|---|---|
| 10 | 0 |
| 20 | 500 |
| 30 | 1000 |
| 40 | 1500 |
| 50 | 2000 |
| 60 | 2500 |

| UPPER LIMIT CURRENT VALUE (A) | LASER OUTPUT POWER (W) |
|---|---|
| 12 | 0 |
| 22 | 500 |
| 32 | 1000 |
| 42 | 1500 |
| 52 | 2000 |
| 62 | 2500 |

| ELAPSED TIME(Hr) | RELAXATION RATE |
|---|---|
| 0 | 1.00 |
| 2000 | 1.04 |
| 4000 | 1.08 |
| 6000 | 1.12 |
| 8000 | 1.16 |
| 10000 | 1.20 |

LASER OSCILLATOR APPARATUS AND POWER SUPPLY APPARATUS THEREFOR, AND CONTROL METHOD THEREFOR

This application is a National Stage of International Application No. PCT/JP2006/308602 filed Apr. 25, 2006.

FIELD OF THE INVENTION

The present invention relates to protection of components such as optical components for use in laser oscillator apparatuses.

BACKGROUND OF THE INVENTION

In a conventional power supply apparatus for a laser oscillator apparatus, an upper limit current value is determined according to a rated current value in pumping means, for example, a lamp or a laser diode, and the upper limit current value is compared with a detected current value. After a period of time has elapsed after the detected current value exceeds the upper limit current value, the supply of the current has been shut down to thereby protect the pumping means (for example, see Patent document 1).

Patent document 1

Japanese Unexamined Patent Application Publication S63-250883 (claims)

DISCLOSURE OF THE INVENTION

Problems that the Invention is to Solve

Over a long period of use of a laser oscillator apparatus, dirt, such as dust or organic substances in the ambient, adheres to the surface of an optical component such as a partial reflector. Dirt occurring in an optical component or the like causes efficiency of a laser oscillation to lower due to an energy loss (which is in effect a heat dissipation) in the optical component, thereby reducing a laser output power. At that time, a control operation for maintaining the laser output power constant attempts to keep the output power constant by increasing a current flowing through a laser diode and thereby performing an operation such as compensating for a reduced amount of the laser output power. However, when, while the efficiency of laser oscillation is reduced, the current flowing through the laser diode is increased, i.e., when an energy to be supplied to the laser is increased, an amount of energy loss in the optical component where dirt has occurred increases; in other words, it means that heat dissipation increases. This causes the dirt to further develop, and browning (brown discoloring) of the optical component to grow, which eventually results in fatal damages leading to the replacement of the component.

Although in the above-described conventional technique an upper limit current value is determined, because an upper limit current value corresponding to a rated current value of the pumping means, e.g., the laser diode, is set, a current up to a fixed upper limit current value is to be supplied to the pumping means, regardless of the magnitude of a laser output power command value. Thus, as in the foregoing description, when the dirt occurs in the optical component to thereby cause the reduction of the laser output power, the energy loss increases in the optical component, resulting in the likelihood of damages leading to the replacement of the associated component.

Means for Solving the Problem

A laser oscillator apparatus according to the present invention for measuring an output of a laser beam emitted therefrom, for comparing the measured output value with a desired laser output power command value, and for providing a feedback control loop of a current to be supplied to pumping means that pumps a laser medium so that a laser output power corresponding to the laser output power command value can be achieved, the laser oscillator apparatus comprises upper limit current value determination means that determines according to the laser output power command value an upper limit current value that limits a current supplied by the feedback control loop to the pumping means, and current-limiting means that limits a value of the current to be supplied by the feedback control loop so that the value of the current is below the upper limit value determined by the upper limit current value determination means.

Advantageous Effects

In the present invention, an upper limit current value for limiting a current supplied to pumping means is determined using a laser output power command value, whereby the increase of a current to be supplied to the pumping means, i.e., the increase of energy supplied to a laser oscillator apparatus can be avoided. Further, an energy loss in the optical component can be reduced and damage development leading to the replacement of the component can be prevented.

BRIEF DESCRIPTION OF THE DRAWINGS

FIG. 3 shows a table illustrating characteristics of a laser diode;

FIG. 4 is a schematic diagram illustrating determination of an upper limit current value of the laser oscillator apparatus, in Embodiment 1 according to the present invention;

FIG. 5 is a block diagram of a configuration of an upper limit current value determination unit of the laser oscillator apparatus in Embodiment 1 according to the present invention;

FIG. 6 shows a table illustrating an example of a configuration of upper limit current values of the laser oscillator apparatus in Embodiment 1 according to the present invention;

DESCRIPTION OF THE PREFERRED EMBODIMENTS

Embodiment 1

Figure 1:
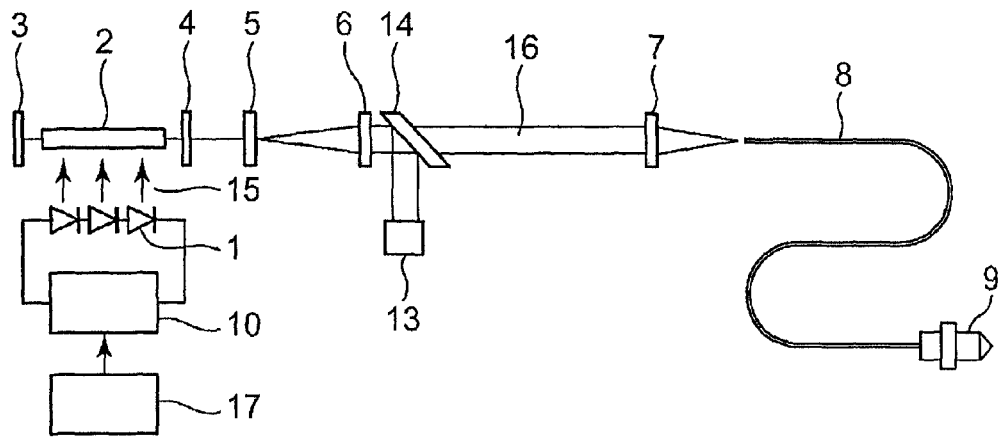
FIG. 1 is a schematic diagram of a configuration of a laser machining apparatus using a laser oscillator apparatus, illustrating Embodiment 1 according to the present invention.

FIG. 1 is a schematic diagram of a configuration of a laser machining apparatus using a laser oscillator apparatus, in Embodiment 1 for implementing the present invention. A DC current supplied from a power supply apparatus 10 is supplied to laser diodes 1, a laser medium 2 is pumped with pumping light 15 obtained by emitting light from the laser diodes 1, and then resonance is made to occur between a total reflection mirror 3 and a partial reflection mirror 4, whereby laser beams 16 are obtained. The laser beams thus obtained are expanded and collimated with an expansion lens 5 and a collimation lens 6, respectively, and then condensed at the end face of an optical fiber 8 through an optical fiber incident lens 7. The condensed laser beams, which pass through the inside of the optical fiber 8, are conducted, through a working head 9, to a predetermined place. A laser output power is measured by making part of the laser beams strike a power monitor 13 using a partial reflection mirror 14. The laser output power can be adjusted by varying a current flowing through the laser diodes 1. In general, a laser output power command determination value is given from a controller 17 that is provided externally, to the power supply apparatus 10 supplying the current to the laser diodes 1; the power supply apparatus 10 controls the current that is to be supplied to the laser diodes 1.

Figure 2:
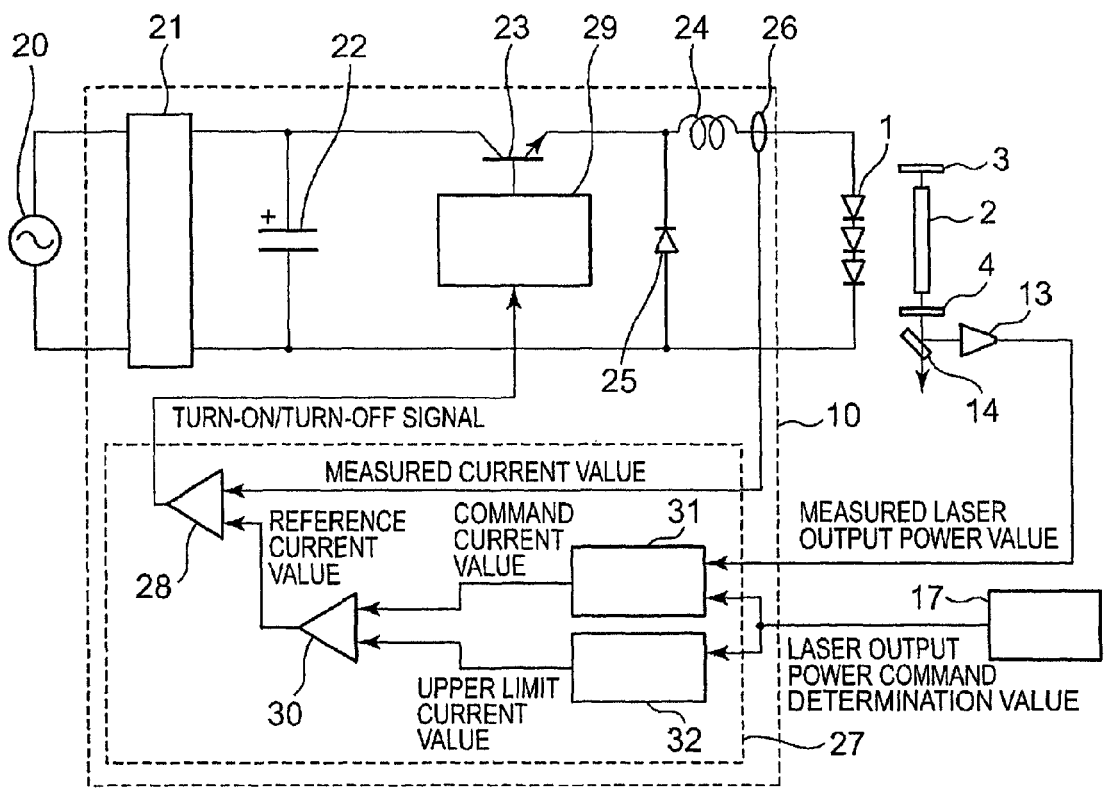
FIG. 2 is a schematic diagram of a configuration of the laser oscillator apparatus, illustrating Embodiment 1 according to the present invention.

FIG. 2 is a schematic diagram of a configuration of a laser machining apparatus in Embodiment 1 for implementing the present invention, and more particularly a view illustrating the inside of the power supply apparatus 10. A voltage supplied from an external voltage source 20 is converted using a rectifier 21 into a DC voltage, which in turn charges a capacitor 22. Then, turn-on of a transistor 23 causes the current to start via a reactor 24 to flow in the laser diodes 1. While the transistor 23 keeps turned on, the amount of current that is supplied to the laser diodes 1 increases. Thus, when the current amount turns out to be more than the desired one, the transistor 23 is turned off to feed the current back to the diode 25, thereby reducing the amount of the current. Conversely, when the current amount goes below the desired one, the transistor 23 is turned on to thereby increase the current. Repeating the turn-on and turn-off controls the current to be the desired current value.

Here, the current control operation will be described in a greater detail. The value of the current that now flows through the laser diodes 1 is measured, and the measured value is loaded into a current controller 27. The measured current value that has been loaded, and a reference current value that serves as the reference, are input to a first comparator 28. When the measured value of the current, which is the current flowing through the laser diodes 1, is lower than the reference current value, the first comparator 28 forwards, for instance, a 5-volt turn-on signal to a drive circuit 29 for the transistor 23, in order to turn on the transistor 23. If the measured current value is above the reference current value, then the first comparator 28 forwards, for instance, a zero volt turn-off signal to a drive circuit 29 for the transistor 23 in order to turn off the transistor 23. Based on commands of the turn-on and turn-off of the transistor 23, thus forwarded from the first comparator 28, the drive circuit 29 for the transistor 23 supplies a current or a voltage needed for actually turning on or turning off the transistor 23, thereby achieving the turn-on and turn-off thereof. Through such operations, the value of the current supplied to the laser diodes 1 is controlled to be the reference current value.

Next, determining the reference current value will be described. In the present invention, a command current value and an upper limit current value are input to a second comparator 30; if the command current value is below the upper limit current value, then the command current value is output as the reference current value, to the downstream first comparator 28; conversely, if the command current value is above the upper limit current value, then the upper limit current value is output as the reference current value, to the downstream first comparator 28. Stated differently, the reference current value is limited to be below the upper limit current value.

Here, the command current value will be described. The command current value is determined in a command current value determination unit 31 as shown in FIG. 2. Laser output power command determination values, such as an output determination value manually entered by an operator, and an output determination value in a machining program, are input, as digital values or voltage converted values (corresponding to, for example, a command value of 4,000 W when the voltage is 5 volts), to the command current value determination unit 31. Likewise, the laser output power value measured with the power monitor 13 is also input, as a digitized value or a voltage conversion value, in the command current value determination unit 31. In the command current value determination unit 31, a command current value that is needed to make the measured laser output power value equal to a laser output power command determination value is calculated. For example, if the measured laser output power value is greater than the laser output power command determination value, then the command current value is increased; conversely, if it is smaller, then the command current value is reduced. This means that according to the difference between the measured laser output power value and the laser output power command determination value, a current value to be supplied to pumping means can be computed based on data of laser output power variations against current variations. A current value obtained by the computation is output as a command current value, then a current value that is actually supplied to the pumping means is controlled so as to be the command current value, and a laser output power is re-measured. Repetition of a series of the actions described above causes the laser output power to converge to the laser output power command determination value. This control operation refers to a feedback control technique commonly used in the laser output power control operation.

Next, the upper limit current value will be described. As shown in FIG. 2, the laser output power command determination value is input to the upper limit current determination unit 32 as well. The upper limit current determination unit 32 determines an upper limit current value, in accordance with a laser output power command determination value that has been input. An example of determining the upper limit current value from the laser output power command determination value will be described as below.

When the pumping means uses the laser diodes 1, after the current value exceeds a threshold current—a minimum current needed for laser oscillation—a pumping power from the laser diodes increases substantially linearly with the increase of the current, which allows a relationship between a current I and a pumping power W to be approximated as follows:

$$W = A1 \times I - B1 \qquad \text{Equation 1}$$

where A1 and B1 are constants.

Likewise, also in a relationship between the laser output power of the laser oscillator apparatus and the pumping power of the laser diode, since, after the current value exceeds the threshold current, the laser output power increases substantially linearly as the pumping power increases, a relationship between a pumping power W and a laser output power P can be approximated as follows:

$$P = A2 \times W - B2 \qquad \text{Equation 2}$$

where A2 and B2 are constants.

From Equations 1 and 2, the following equation holds:

$$P = (A1 \times A2) \times I - A2 \times B1 - B2 \qquad \text{Equation 3}$$

From Equation 3, a current value needed to obtain a laser output power P can be approximated by the following equation:

$$I = AP + B \qquad \text{Equation 4}$$

where $A = 1/(A1 \times A2)$, and $B = (A2 \times B1 + B2)/(A1 \times A2)$.

Constants A and B can be determined if values A1, A2, B1 and B2 are known. In order to determine the values A1, A2, B1 and B2, a pumping power of varying the current of the laser diode is measured, and the values are approximated by Equation 1. Likewise, a relationship between the pumping power and the laser output power is approximated by Equation 2. Such approximations give values A1, A2, B1 and B2, and then the constants A and B.

Here, when a laser oscillator apparatus is pumped by using a plurality of laser diodes, or when the laser oscillator apparatus comprises a plurality of optical components, there could be variations in characteristics of the respective laser diodes or optical components. Thus, when determining the values A1, A2, B1 and B2, it becomes necessary to make an approximation using a center value in variations of characteristics that the laser diode or the laser oscillator apparatus can assume, or using that of the worst characteristic, i.e., that which produces the lowest output when the same current is supplied thereto. An example of the calculation is shown below.

FIG. 3 shows characteristics of the laser diode-pumping power values against values of the current flowing through the laser diodes 1. Among laser diodes that are used, that of the worst characteristic is assumed to have an output characteristic as shown in FIG. 3a, and that of the best characteristic, to have an output characteristic as shown in FIG. 3b. In determining the values using center values, the center value is (0 W+10 W)/2=5 W at 20 A; the output value is (30 W+40 W)/2=35 W at 50 A. Thus, substitution of the values into Equation 1 gives the values A1 and B1. Also, when using the worst characteristic one, substitution of 0 W at 20 A and 30 W at 50 A, which are values shown in FIG. 3a, into Equation 1 gives the values A1 and B1. Likewise, in determining the values A2 and B2 as well, the use of values in the best and worst characteristics of the laser oscillator apparatus allows such values to be determined. It is preferable that those values be determined in a state where no dirt occurs in optical components, such as in the initial stage or in a state after maintenance service of the laser oscillator apparatus. Determining the upper limit current value, with this state serving as the reference state, allows the increase of current value owing to dirt on optical components to be effectively prevented. Equation 4 is represented by a solid line in FIG. 4, in a graph in which a laser output power is plotted on the horizontal axis and a current value is plotted on the vertical axis. Here, a current value needed to obtain the laser output power command determination value is known by considering the laser output power as a laser output power command determination value.

In the present invention, the upper limit current value is determined based on FIG. 4; however, the increase of current is also affected by variations such as those of cooling water temperature or ambient temperature, other than output power reduction due to dirt on the optical components and the like. Thus, the upper limit current value needs to be determined by considering, on the needed current value calculated from Equation 4, the variations of the current value due to variations such as those of cooling water temperature and ambient temperature. The magnitude of influence varies according to a configuration of the pumping means or the laser oscillator apparatus. When a laser diode is used, the cooling water temperature is comparatively strictly controlled and the magnitude of influence is low; however, there occur variations of approximately ±2-3% in the output stability. As the output varies in a range of ±2-3%, the current also varies in a range of ±2-3%. In consideration of this variation, for the upper limit current value, 2-3% of a needed current value calculated from Equation 4 needs to be added to the needed current value. For instance, when the current value needed to obtain a given output power is assumed as 50 A, the upper limit current value needs to be 51 A through 51.5 A. The thus determined upper limit current value is indicated by broken line A in FIG. 4. The slope of the broken line A is zero in the neighborhood where the laser output power is at its maximum; this is because the current value is prevented from exceeding a current value of the upper limit imposed by a value such as the rated current value of the pumping means. In the broken line A in FIG. 4, as an example, a value attained by adding a current of 2 A to the needed current value calculated from Equation 4 is assigned as the upper limit current value. Furthermore, the greater the laser output power, the more degradation of the optical components due to dirt develops. For this reason, a determination can be made in such a way that the greater the laser output power command determination value, the smaller the margin between the needed current value calculated from Equation 4 and the upper limit current value becomes. For example, when the laser output power is at the center value in the range from zero to the maximum value, the margin between the current value and the upper limit current value is determined as 2 A. When the laser output power command determination value is 0 W, the margin is determined as 4 A; when at the maximum output power, the margin is determined as 0 A.

The upper limit current value thus determined is represented as broken line B in FIG. 4. The broken line B is more advantageous for protection of the optical components than the broken line A. However, when a high power laser beam is used, because the line B has a tolerance less than the line A relative to the current value, the ambient temperature variations or water temperature variations cause the current value to reach the upper limit current value, resulting in a further possibility of the output power not being produced. Thus, when the apparatus largely employs a high output, the upper limit current value may be determined based on broken line A in FIG. 4, while when the apparatus hardly employs the high output, the current value may be determined based on broken line B. Furthermore, the above-described upper limit current value is calculated as below. FIG. 5 is an internal configuration of the upper limit current determination unit 32. As shown in FIG. 5, a storage unit 35 is provided in the upper limit current determination unit 32; the slope of the upper limit current value A or B in FIG. 4 and the intercept y, which are pre-calculated, are stored in the storage unit 35. Then, an upper limit current value calculator 36, constituted by such as a microcomputer in the upper limit current determination unit 32, computes the upper-current current value based on the slope and intercept y data stored in the storage unit 35, and a laser output power command determination value to be input from the controller 17.

In this way, the upper limit current value, which is calculated with the upper limit current determination unit 32, and the command current value, which is determined in the command current value determination unit 31, are input to the second comparator 30. If the laser oscillator apparatus operates normally, then the command current value is output as a reference current value; based on the reference current value, the laser output power is controlled by a feedback control loop so as to be a command determination value. On the other hand, when the power is decreased due to dirt on the optical component, an upper limit current value is output as a reference current value, where the upper limit current value limits a current needed to obtain the laser output power of the laser output power command determination value so as to exceed by only the order of several amperes. Since a current supplied to pumping means is controlled by a feedback control loop based on this reference current value, a current supply is to be limited by the upper limit current value. With this arrangement, unlike the case with a conventional laser oscillator apparatus, a current value does not increase up to the rated current value of a laser diode, thus preventing dirt from developing into fatal one leading to the replacement of the optical component.

Figures 6A, 6B, 7:
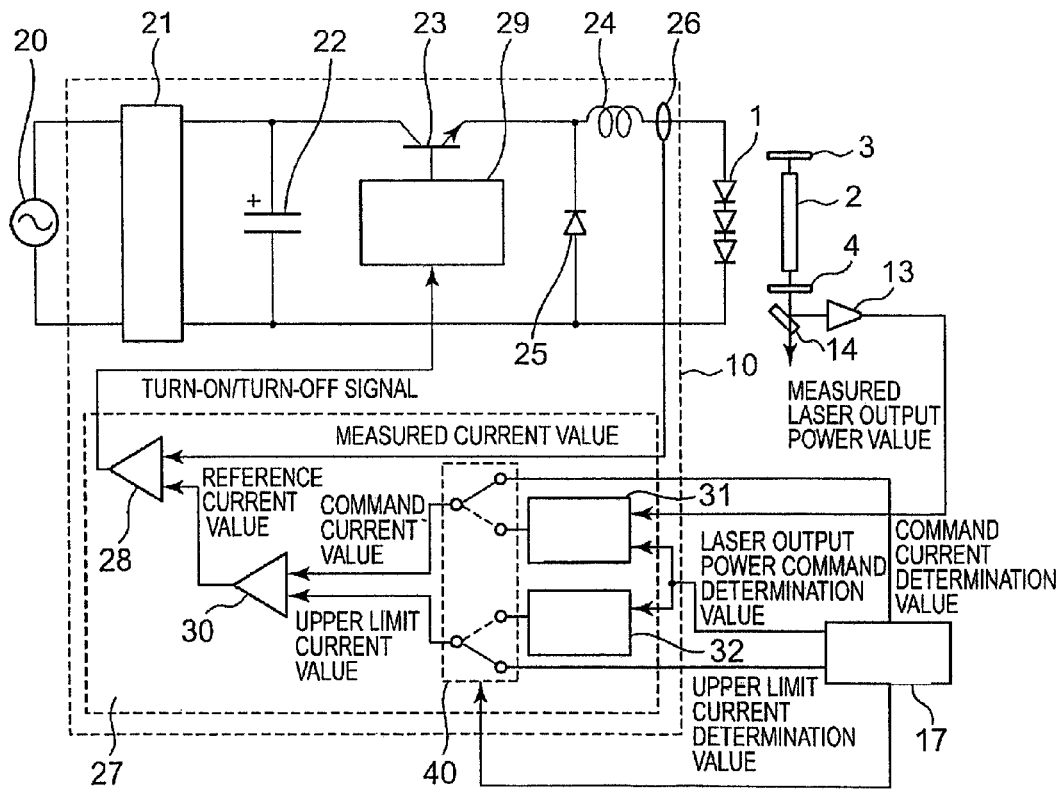
FIG. 7 is a schematic diagram of another configuration of a laser oscillator apparatus, illustrating Embodiment 3 according to the present invention.

For example, as is shown in FIG. 6a, in a laser oscillator apparatus having characteristic of varying a laser output power with respect to a current supplied to pumping means, an upper limit current value is assumed to be determined as shown in FIG. 6b, based on the broken line A in FIG. 4. In this situation, when, while the laser output power of 2000 W is used, the current value is assumed to increase up to the upper limit current value due to dirt on the optical component, the increase of the current value can be limited to 2 A. On the other hand, in a conventional laser oscillator apparatus, if the rated current value of the laser diode is 70 A and there is heavy dirt on the optical component, then in a worst case the current of 70 A is supplied, with the current value increasing by 20 A. An electrical energy corresponding to the increase amount of this current value is one which is supplied to compensate for an energy amount consumed owing to dirt on the optical component. When a current flowing through the laser diode increases by 1 A, the output power increases by 1 W in a case of the laser diode of characteristics shown in FIG. 3a. A high power laser oscillator apparatus uses approximately several-hundred laser diodes; the current increase of 2 A means that several hundred watts of energy amount is absorbed by an optical component having dirt thereon. However, in an optical component for use in a high power output laser oscillator apparatus, heat dissipation of the order of several hundred watts does not cause fatal damage leading to replacement of the component. In a conventional laser oscillator apparatus, however, at worst, several thousand watts of energy is absorbed in the dirt optical component, resulting in a greater possibility of fatal damage leading to replacement of the optical component.

In the present embodiment, an example in which a laser diode is used as the pumping means is described. In a case of another pumping means, only approximation equations in Equations 1 and 2 differ. For example, in a case of a lamp, Equation 1 may be approximated by the second order equation as $P=A1 \times I^2 + A2 \times I + B1$. In a case of other means, the similar approach allows the upper limit current value to be determined in a similar way.

Embodiment 2

In the laser oscillator apparatus according to Embodiment 1, the storage unit 35 has stored the data of the slope and intercept y of the relational expression between the laser output power command value and the upper limit current value. The slope and intercept y are obtained from data in FIGS. 6a and 6b. However, for example, a configuration may also be used where the storage unit 35 stores the data of FIGS. 6a and 6b, and based on which data an upper limit current value corresponding to a laser output power command determination value that has been input to the upper limit current value calculator 36 is selected or calculated. In the present embodiment, a current value is assigned corresponding to a laser output power value that is a discrete one. If the laser output power command determination value is exactly a value stored in the storage unit 35, a then current value may be read out, while if it is an intermediate value of data, a current value in a minimum laser output power exceeding the laser output power command determination value may be used.

To begin with, in situations where data shown in FIG. 6a is stored in the storage unit 35, a description of how to perform a computation in the upper limit current value calculator 36 will be provided. For instance, when the laser output power command determination value is determined as 1800 W, a current value of 50 A at a minimum laser output power exceeding 1800 W, i.e., 2000 W, may be selected as a current value. In addition, a current value may be that obtained by linear approximation between discrete values. When the laser output power value is 1800 W, the current value is 40 A at a laser output power of 1500 W, and the current value of 50 A at 2000 W; thus, by the linear approximation between the two points, the current value at 1800 W may be as follows:

$$(50\ A - 40\ A)/(2000\ W - 1500\ W) \times (1800\ W - 1500\ W) + 40\ A = 46\ A$$

When an upper limit is desired to be determined as indicated by the broken line A in FIG. 4, with respect to the current value that has been calculated in this way, the upper limit current value may be that obtained by adding the current value to a fixed current value (2 A for FIG. 4). In addition, when an upper limit is desired to be determined as indicated by the broken line B in FIG. 4, an expression of a relationship between the amount of current to be increased and a laser output power value is stored (in a case of FIG. 4, a first order equation Y=AX+B that gives 4 A at 0 W, and 0 A at its maximum output power). Then, a current amount to be increased is determined from a laser output power command determination value that has been input; what is necessary is that a value obtained by adding the determined current value to the above-described current value should be output as the upper limit current value.

Next, situations where data shown in FIG. 6b is stored in the storage unit 35 will be described below. For instance, when the laser output power value is set at 1800 W, an upper limit current value of 52 A at a minimum laser output power exceeding 1800 W, i.e., 2000 W, may be selected as a current value. In addition, a current value may be that obtained by a linear approximation between discrete values. When the laser output power value is 1800 W, the current value is 42 A at a laser output power of 1500 W, and the current of 52 A at 2000 W; thus, by the linear approximation between the two points, the current value at 1800 W may be as follows:

(52 A–42 A)/(2000 W-1500 W)×(1800 W-1500 W)+42 A=48 A

The current value thus calculated in the upper limit current value calculator 36, which is an upper limit current per se, may be output as the upper limit value.

The laser oscillator apparatus according to the present embodiment is configured as described above, whereby a measured value or an upper limit current value can directly be stored in a storage unit, unlike the case in Embodiment 1—there is no need to separately derive an expression of a relationship between a laser output power value and an upper limit current value. Thus, advantageous effects can be achieved in which preliminary setting of the laser oscillator apparatus can be reduced, and the laser oscillator apparatus can be prevented from malfunctioning on account of improper determination of the relational expression.

Embodiment 3

A laser oscillator apparatus according to Embodiment 1 or Embodiment 2 is configured to control the current that is supplied through a laser diode so as to emit a desired laser output power. However, varying a current value that is supplied to the laser diode causes a mode of a laser beam emitted from the laser oscillator apparatus to be varied. In machining operations where relatively high accuracy is not required, or in transmitting a laser beam through an optical fiber, mode variation of the laser beam does not pose a problem; however, when no optical fiber is used, and accurate machining is needed, a variation in the mode of the laser beam poses a problem. The present embodiment provides a laser oscillator apparatus that can also be applied to machining operations such as in a case where the mode variation of the laser beam poses a problem.

FIG. 7 is a schematic diagram of a configuration of a laser oscillator apparatus according to the present embodiment. Like reference numerals refer to elements that are the same as those of the laser oscillator apparatus illustrated in FIG. 2 according to Embodiment 1, and detailed description associated therewith will be omitted. Portions differing from those in FIG. 2 will be described below. Other than a laser output power command output determination value, the controller 17 outputs a command current determination value and an upper limit current determination value. The current controller 27 inside the power supply apparatus 10 is provided with a signal switch 40. In Embodiment 1, a command current value from the command current value determination unit 31 and an upper limit current value from the upper limit current determination unit 32 have been forwarded directly to the first comparator 28. On the other hand, in the present embodiment, a signal switch 40 switches between an upper limit current value from the upper limit current determination unit 32 and an upper limit current determination value from the controller 17, to deliver a signal to the second comparator 30, along with switching between a command current value from the command current value determination unit 31 and a command current determination value from the controller 17. Switching operation of the signal switch 40 is controlled by the controller 17. In FIG. 7, when the signal switch 40 is switched to a state shown by the broken line, a command current value from the command current value determination unit 31 and an upper limit current value from the upper limit current determination unit 32 are to be input to the comparator 30. This is the same operation as that in Embodiment 1. Stated differently, control operation is performed applicable to machining with which the mode variation of the laser beam does not pose a problem.

On the other hand, in FIG. 7, when the signal switch 40 is switched to a state as shown by the solid line, a command current determination value and an upper limit current determination value from the controller 17 are to be input to the comparator 30. This operation controls, with no influence from a measured laser output power value, a current flowing through the laser diodes 1 so as to be a command current determination value, i.e., a constant current value. This can reduce the mode variation of a laser beam, thus making the laser oscillator apparatus applicable to precise machining without using an optic fiber. Here, the upper limit current determination value may, as with that in a conventional technique, be determined as a current value corresponding to the rated current value of a laser diode. In a constant current control mode, even when dirt and the like occurring in the optical component causes reduction of a laser output power, a current flowing through the laser diodes 1 does not increase; then, energy loss in the optical component does not increase, thus avoiding a break of the optical component although there is a problem with reduction of the laser output power.

The laser oscillator apparatus according to the present embodiment comprises the above-described configuration. In machining operations where the mode variation of a laser beam does not pose a problem, the laser oscillator apparatus according to the present embodiment functions in the same way as the laser oscillator apparatus according to Embodiment 1, thus achieving similar advantageous effects. Further, an advantage is that since the system can function in a constant current control mode, it is also applicable to machining with which the mode variation of a laser beam pose a problem; in comparison with a laser oscillator apparatus according to Embodiment 1, the laser oscillator apparatus according to the present embodiment has a larger applicable machining range, thus improving general versatility of the system. Further, application of the present configuration to other embodiments provides similar advantageous effects to other embodiments as well.

Embodiment 4

The laser oscillator apparatus according to Embodiment 1 is configured to preliminarily compute, based on a laser output power value and a current value, the slope and intercept y of the equation that calculates an upper limit current value from a laser output power and store them in the storage unit 35. The current value is measured by considering as the reference state a state where no dirt occurs in the optical component—such as, preferably, initial stage and after-maintenance-service state—of the laser oscillator apparatus. The laser oscillator apparatus according to Embodiment 2 has been configured to store a pre-measured current value and a laser output power value, as they are, or those converted into upper limit current values. In the present embodiment, with a state prior to using a laser oscillator apparatus in an actual machining operation being assumed to be the reference state, the laser oscillator apparatus includes means that measures data for determining an upper limit current value and determine, based on the measured data, the upper limit current value, by an operator's instruction and the like. The overall configuration of the laser oscillator apparatus is substantially the same as that shown in FIG. 7 according to Embodiment 3; however, since the upper limit current determination unit 32 and controller 17 differ from those described in Embodiment 3, the upper limit current value determination unit will be described below.

Figure 8:
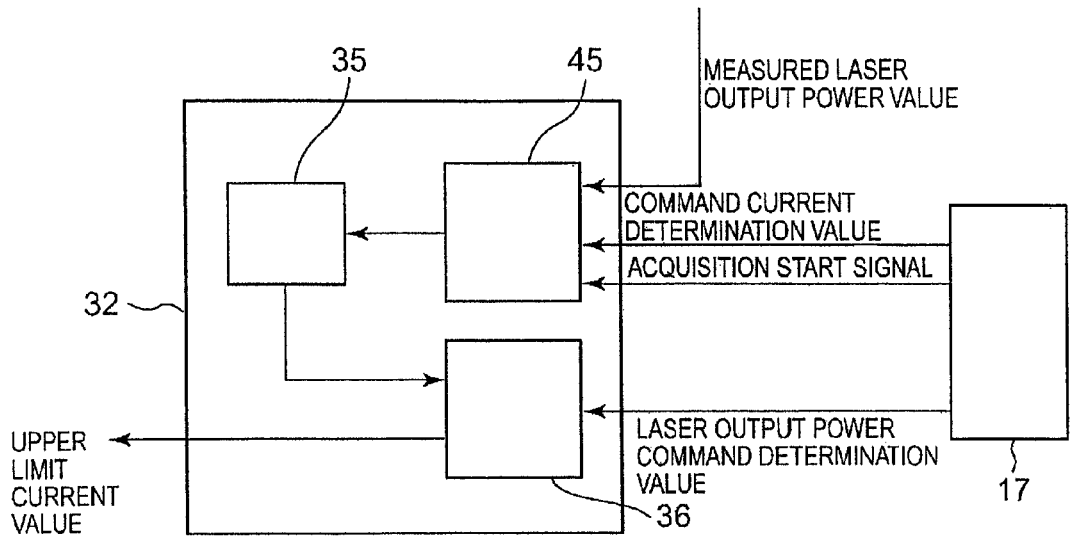
FIG. 8 is a block diagram of a configuration of an upper limit current value determination unit of a laser oscillator apparatus in Embodiment 4 according to the present invention.
Figure 9:
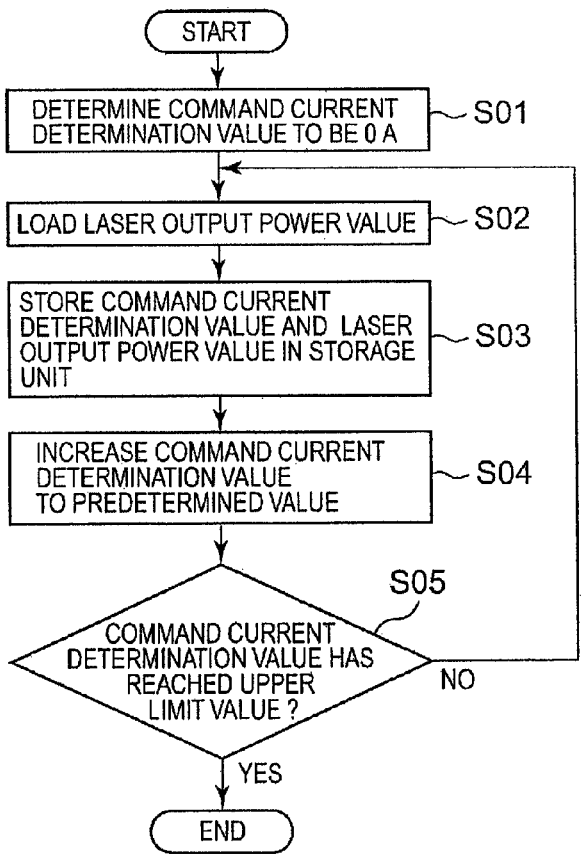
FIG. 9 is a flow-chart illustrating operation of a laser oscillator apparatus in Embodiment 4 according to the present invention.

FIG. 8 is a schematic diagram of a configuration of the upper limit current determination unit 32 according to the present embodiment. In the present embodiment, to begin with, a laser output power value is measured when a command current value is varied, and a relationship between a current supplied to the laser diodes 1 and a laser output power is attained. The relationship therebetween is obtained according to process flow shown in FIG. 9, in a current value and laser output power value measuring unit 45 in FIG. 8. Based on FIGS. 8 and 9, an associated operation will be described below.

In situations where an operator gives to a controller an instruction of determining an upper limit current value, the controller 17 first switches the signal switch 40 to the switch position of a solid line shown in FIG. 7. This action controls a current value according to a command current determination value forwarded from the controller 17. And the controller 17 determines the command current determination value to be 0 A (step S00). Next, the controller 17 forwards an acquisition start signal and a command current determination value to the current value and laser output power value measuring unit 45 (step S01). Upon reception of the acquisition start signal, the current value and laser output power measuring unit 45 reads a measured laser output power value (step S02). Then, the current value and laser output power value measuring unit 45 stores in the storage unit 35 a pair of a command current determination value that has been delivered from the controller 17, and a measured laser output power value that has been loaded (step S03). Then, the controller 17 increases the command current determination value by a given value (step S04). And the controller 17 ascertains whether the command current determination value has reached an upper limit current value (step S05). Unless the command current determination value has reached the upper limit current value, then process flow returns to step S01; the processes of step S01, step S02 and step S03 are re-implemented, whereby a pair of a current determination value and a measured laser output power value is stored in sequence in the storage unit 35. When, while this process is repeated, the command current determination value reaches the upper limit current determination value at step S05, the process for obtaining the relationship between the current value and the laser output power terminates.

By such process flow, the relationship between the current value and the laser output power can be attained, which causes, for instance, data as shown in FIG. 6a, to be stored in the storage unit 35. Although, in the foregoing description, the command current determination value has been assumed to be input to the current value and laser output power value measuring unit 45, the same data can be acquired by inputting thereto a measured current value from a current sensor. Further, at step S03, the current value and laser output power value measuring unit 45 converts the command current determination value that is sent from the controller 17 into an upper limit current value to thereby store in the storage unit 35, whereby data as shown in FIG. 6b is stored in the storage unit 35. When the upper limit current value as that indicated by the broken line A in FIG. 4 is desired to be determined, the following process may be used as a method of converting a command current determination value into an upper limit current value; the current value and laser output power value measuring unit 45 adds the command current determination value with a fixed current value (2 A for FIG. 4), then the storage unit 35 stores the sum value as an upper limit current value. Moreover, when an upper limit needs to be determined as that indicated by the broken line B in FIG. 4, the following process may be used. An expression of a relationship between the amount of current to be increased and a laser output power value (for FIG. 4, a first order equation Y=AX+B that gives 4 A at 0 W, and 0 A at its maximum output) is stored in the current value and laser output power value measuring unit 45. Then, a current value to be increased is calculated from an inputted laser output power value. Then, the calculated value and the command current determination value are summed together. Finally, the calculated value is stored as the upper limit current value in the storage unit 35.

Here, when an increase amount of the command current in step S04 is determined to be a small amount, the current value takes time to reach the upper-limit one although measurement accuracy is improved. In contrast, when determined to be a large amount, the measurement accuracy is reduced comparatively although the measurement is fast to complete. For this reason, the increase amount thereof may be determined as appropriate by weighing with either accuracy or time.

Figure 10:
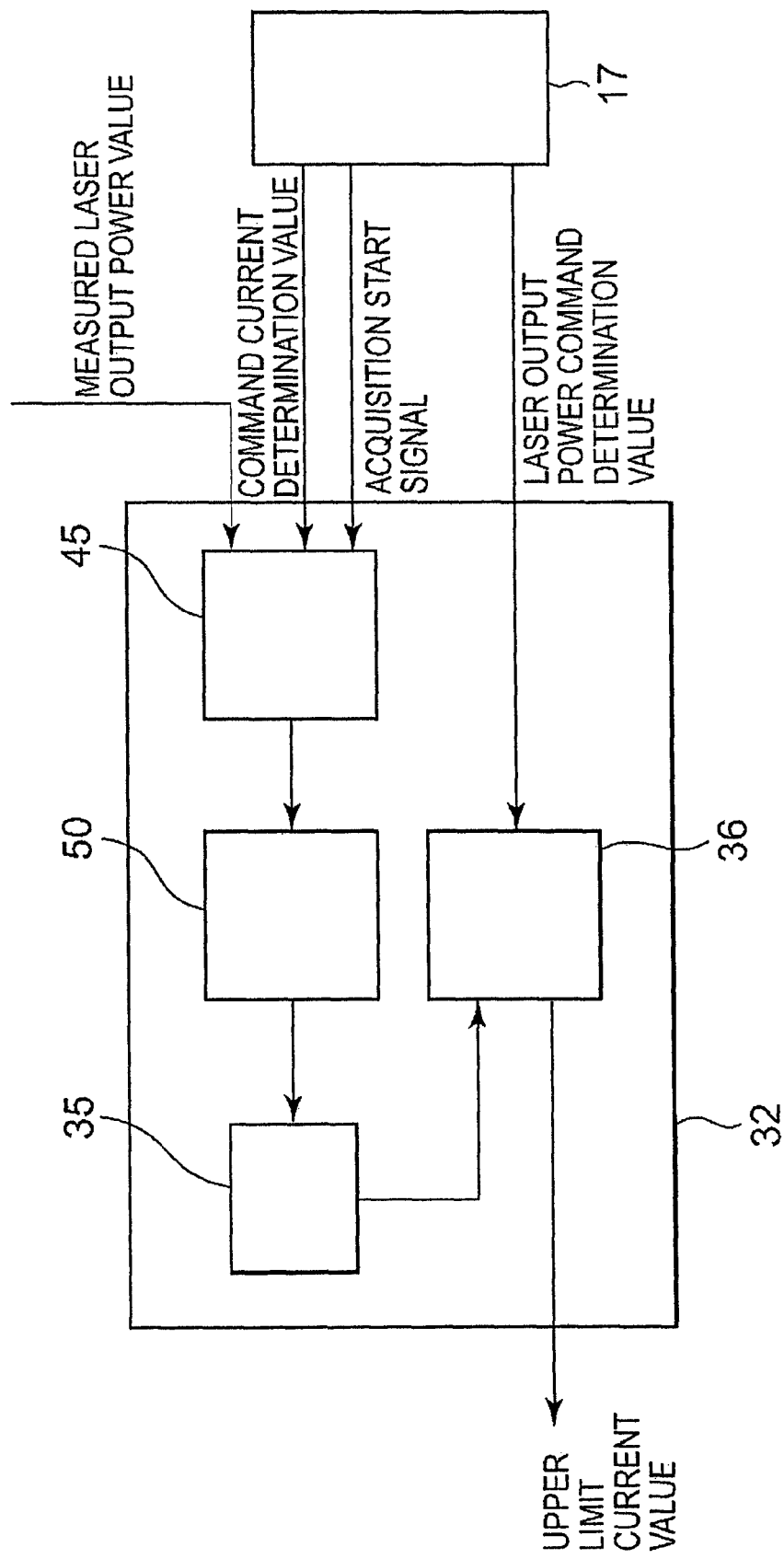
FIG. 10 is a block diagram of another configuration of an upper limit current value determination unit of the laser oscillator apparatus in Embodiment 4 according to the present invention.

After the storage unit 35 has stored the above data, the signal switch 40 is switched by the controller 17 to the position shown by the broken line in FIG. 7, and the laser oscillator apparatus is controlled according to a laser output power determination value to be output from the controller 17, whereby an advantageous effect similar to that in Embodiment 2 is achieved. Data being stored in the storage unit 35, which is a pair data of a laser output power and a command current determination value, or an upper limit current value, may be stored in the storage unit 35 as relational expression between the laser output power and the upper limit current value, thus resulting in a storage amount being able to be reduced in the storage unit 35. In this situation, the upper limit current determination unit 32 is configured as shown in FIG. 10. Referring to FIG. 10, a pair of data of a command current determination value and a laser output power measured value, which are supplied from the current value and laser output power value measuring unit 45, are input to a relational expression calculator 50. Then the calculator 50 conducts calculations to thereby obtain an expression of a relationship between the laser output power and the upper limit current value. Then, the storage unit 35 stores data of the slope and intercept y of the obtained relational expression. In obtaining the relational expression as shown by the broken line A in FIG. 4, the relational expression may be obtained in the relational expression calculator 50 using a laser output power value, and a value obtained by adding the command current control value to a fixed value. In addition, in obtaining the relational expression as shown by the broken line B in FIG. 4, first, an increased amount of the current corresponding to the laser output power is represented by a first order equation, which is preliminarily stored in the relational expression calculator 50. Using the first order equation, the increased current amount is calculated from the measured laser output power value. Then, the increased amount and the command current determination value are summed together. The relational expression may be obtained from the summation value and the laser output power value. The relational expression calculator 50 stores the slope and intercept y of the obtained relational expression. Implementing the above-described process causes data similar to those in Embodiment 1 to be stored in the storage unit 35. Thus, when used for an actual machining operation, by placing the signal switch 40 in a position as shown by the dotted line in FIG. 7, the laser oscillator apparatus may be operated through a control operation similar to that in Embodiment 1.

In the present embodiment, the laser oscillator apparatus includes means that measures data for determining an upper limit current value, and that determines the upper limit current value based on the measured data. With this arrangement, the laser oscillator apparatus creates and stores data to be stored in the storage unit 35, which thus allows further reduction of preliminary setting of the laser oscillator apparatus.

In the above-described laser oscillator apparatus, a person such as an operator gives an instruction of the time of storing the data in the storage unit 35—i.e., the time of selecting the reference state of the laser oscillator apparatus, for determining the upper limit current value. However, the data may be stored on a regular basis; alternatively, it may be stored at the same instance when the operational state of the laser oscillator apparatus varies, i.e., when, after the apparatus has conducted storing in an early time of the system introduction, the value of current rises to the upper limit current value and the optical components are cleaned. In storing the data at regular intervals, when dirt has occurred in the optical component just before data acquisition and the data is acquired in the dirty state, the laser oscillator apparatus is likely to recognize the dirty state of the optical component as the normal state. Thus, as will be discussed below, comparison of data acquired last time with data acquired this time prevents misrecognition and improves reliability. An embodiment of comparing the last time data with the data acquired this time will be described. The controller 17 varies a command current determination value, and a laser output power at that time is measured to store the measured output value in, for example, the controller 17. The controller 17 calculates the amount of variation between the laser output power value measured last time and that measured this time. If this variation amount is below a fixed value, then it is judged normal and if above the fixed value, then abnormal, whereby an output signal is produced to an external apparatus. A method of defining the fixed value includes that of estimating the value using the degradation amount of the pumping means and measurement time interval between this time and last time. For example, temporal characteristic degradation of the pumping means decreases by 20% for 10 thousand hours, that is, an effective laser output power is assumed to be reduced by 20% as well; if the time interval between the last and this time measurement is 1000 hours, then it can be determined to be normal when the laser output power varies by 2% and to be abnormal when above 2%.

As discussed above, in order to obtain the relationship between the current value and laser output power, the relationship therebetween is established by varying the command current value and measuring the laser output power at that time. However, such relationship can be established by measuring a current value of varying a laser output power command value and being controlled on a fixed output basis.

Independently-operating microcomputers may serve each of the functions of the storage unit 35, the upper limit current calculator 36, the current value and laser output power value measuring unit 45, and the relational expression calculator 50, as have been discussed thus far; however, a single microcomputer can handle the whole functions. Further, the current controller 27 and the controller 17 may also be integrally configured by the microcomputer or the like.

Embodiment 5

The pumping means is temporally degraded even in a normal state. Thus, even though optical components and the like are normal, a current supplied to the pumping means needs to be increased temporally in order to maintain a constant laser output power. For this reason, even though the optical components and the like are normal, the value of current supplied to the pumping means may, in some cases, reach the upper limit current value. In the present embodiment, the upper limit current value is varied according to the temporal degradation of the pumping means.

Figure 11:
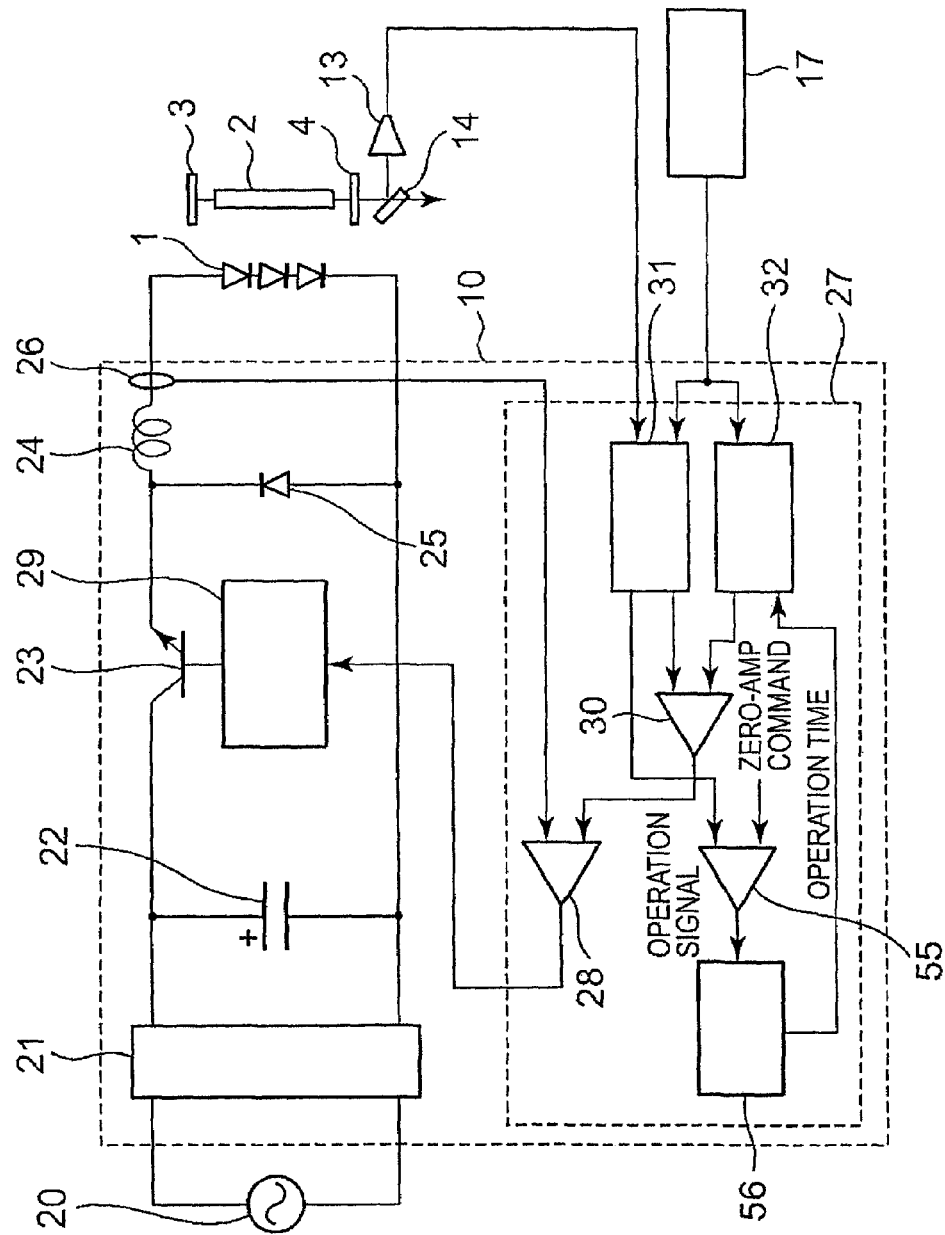
FIG. 11 is a schematic diagram of a configuration of a laser oscillator apparatus, illustrating Embodiment 5 according to the present invention.
Figures 12, 13:
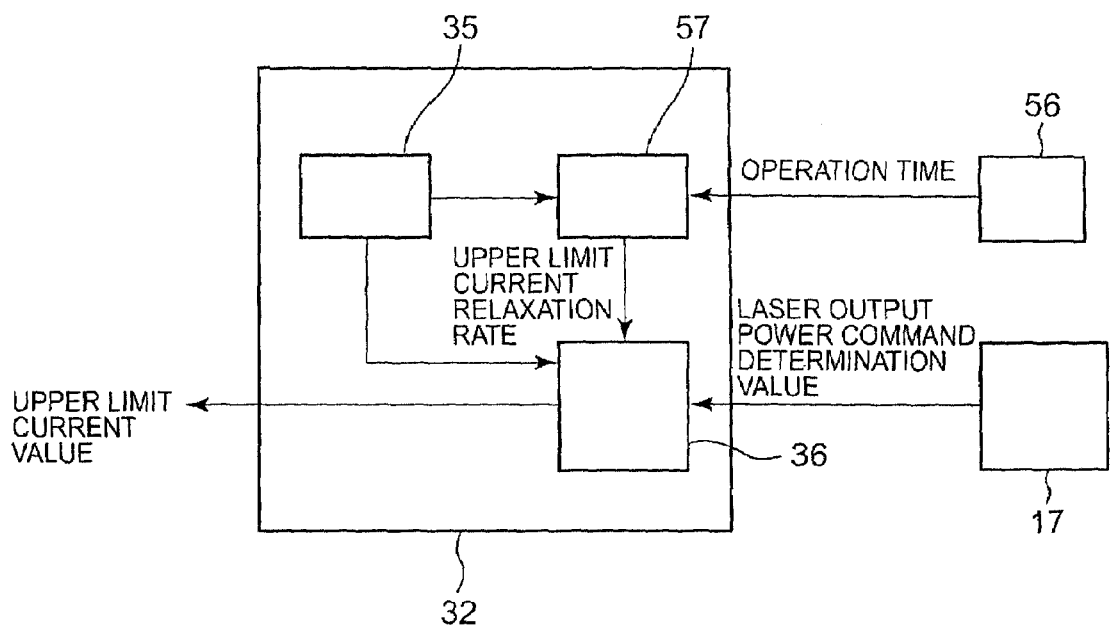
FIG. 12 is a block diagram of a configuration of an upper limit current value determination unit of a laser oscillator apparatus in Embodiment 5 according to the present invention.
FIG. 13 shows a table illustrating an example of determination of an upper limit current value relaxation rate of the laser oscillator apparatus, in Embodiment 5 according to the present invention.

FIG. 11 is a schematic diagram of a configuration of a laser oscillator apparatus according to the present embodiment; FIG. 12 is a block diagram of an internal configuration of an upper limit current value determination unit of the laser oscillator apparatus according to the present embodiment. Where differing from that in FIGS. 2 and 5 according to Embodiment 1 are: a current supply evaluation unit 55 and an operation signal accumulation timer 56 are added, and an upper limit current relaxation rate calculator 57 is additionally provided in the upper limit current determination unit 32. In FIG. 11, a command current value, received from the command current value determination unit 31, is forwarded to the current supply evaluation unit 55 to then be compared with the current of 0 A. If the command current value is greater than 0 A, then, with the current being assumed to be supplied, the operation signal is delivered to the operation signal accumulation timer 56. The operation signal accumulation timer 56 sums the time while the operation signal is being supplied, and the time (operation time) is at all times forwarded to the upper limit current determination unit 32. In addition, once the laser oscillator apparatus is powered off, the operation signal accumulation timer 56 stores a total operation time at that time. In situations where it is re-powered, the already stored total time is added with a time totalized while the operation signal is on, whereby the total operation time from the beginning can be calculated.

Referring to FIG. 12, the storage unit 35 stores a relational data between the relaxation rate of the upper limit current value and an operation time during which a current is supplied to pumping means as shown in FIG. 13. FIG. 13 shows data in situations where the pumping means, when used for 10,000 hours, degrades by 20%; the value of the relaxation rate is appropriately determined according to pumping means to be used. Referring to FIG. 12, the upper limit current relaxation rate calculator 57 reads the relational data as shown in FIG. 13, which is stored in the storage unit 35, between the relaxation rate and an operation time. Then the calculator 50 compares the data with an operation time received as an input from the operation signal accumulation timer 56, to thereby calculate the upper limit current relaxation rate, finally forwarding it to the upper limit current calculator 36. In the upper limit current calculator 36, an upper limit current value in which an operation time is considered is determined by multiplying the relaxation rate by the upper limit current value. Data of the upper limit current relaxation rate may, in some cases, assume discrete values as shown in FIG. 13. In this situation, the upper limit current relaxation rate may be determined by using an upper limit current relaxation rate in a minimum time exceeding the operation time, or by representing by linear approximation between discrete values.

To begin with, the situations where the upper limit relaxation rate in a minimum time exceeding the operation time will be described. For example, the upper limit current value and the upper limit current value relaxation rate are determined based on FIG. 6b and FIG. 13, respectively. When the operation time is 3,000 hours, the laser output power command determination value is assumed to be 2,000 W. From FIG. 13, the upper limit relaxation rate in a minimum time exceeding the operation time is 4,000 hours. Thus, the upper limit current relaxation rate calculator 57 calculates, based on the storage unit 35, the upper limit current relaxation rate as 1.08. The calculated rate is forwarded to the upper limit current value calculator 36. Further, the laser output power command determination value is 2,000 W; thus, in the upper limit current value calculator 36, the upper limit current value in situations where the upper limit current relaxation rate is not considered is calculated as 52 A from FIG. 6b. Then, in the upper limit current value calculator 36, the upper limit current relaxation rate of 1.08 is multiplied by the upper limit current value of 52 A, whereby the upper limit current value in consideration of temporal degradation of the pumping means is given as follows:

$$52 A \times 1.08 = 56.16 A$$

Next, situations where the linear approximation between discrete values gives the upper limit current relaxation rate will be described by applying the same condition as the foregoing one. From FIG. 13, the upper limit relaxation rate is 1.04 for 2,000 hours and 1.08 for 4,000 hours. Thus, the upper limit current relaxation rate calculator 57 calculates, based on data in the storage unit 35, the upper limit current relaxation rate in an operation hours of 3,000 hours as below.

$$1.04 + (1.08 - 1.04)/(4000 - 2000) = 1.06$$

The calculated relaxation rate is forwarded to the upper limit current value calculator 36. In the upper limit current value calculator 36, the upper limit current value is calculated by multiplying the upper limit current value of 52 A obtained from data in the storage unit 35 by the relaxation rate of 1.06 delivered from the upper limit current relaxation rate calculator 28, as follows:

$$52 A \times 1.06 = 55.12 A$$

The foregoing example has employed discrete data of the relaxation rate stored in the storage unit 35; however, the value can be calculated by representing an operation time of the pumping means and a degradation rate as an approximation equation. For example, when a pumping amount of the pumping means decreases by 20% for an operation time of 10,000 hours, the upper limit current relaxation rate is approximated as follows:

$$1 + 0.2 \times (\text{operation time}/10000) \quad \text{Equation 5}$$

While the upper limit current relaxation rate calculator 57 stores this relational expression 5, the upper limit current relaxation rate calculator 57 calculates an upper limit current relaxation rate from an entered operation time of the pumping means. Then, the calculated upper limit current relaxation rate is forwarded to the upper limit current value calculator 36; the upper limit current value may be calculated by the same calculation as the foregoing one. The storage unit 35 may store the relational expression. In the above discussion, situations where the operation time affects the degree of degradation of the pumping means have been described. However, when the number of operations of the pumping means (the number of turn-ons and turn-offs) affects the degree of degradation thereof (the number of turn-ons and turn-offs), the foregoing operation time may be replaced with the number of the operations, and the latter may be used as a degradation index.

Such a configuration allows a temporal degradation of the pumping means to be corrected, thus improving reliability.

Embodiment 6

In any case of the foregoing embodiments, a current value is controlled to be below an upper limit current value. When the current value reaches the upper limit current value, it is not preferable to leave an apparatus as it is because certain abnormalities are very likely to have occurred. The present embodiment comprises means that detects such abnormalities.

Figure 14:
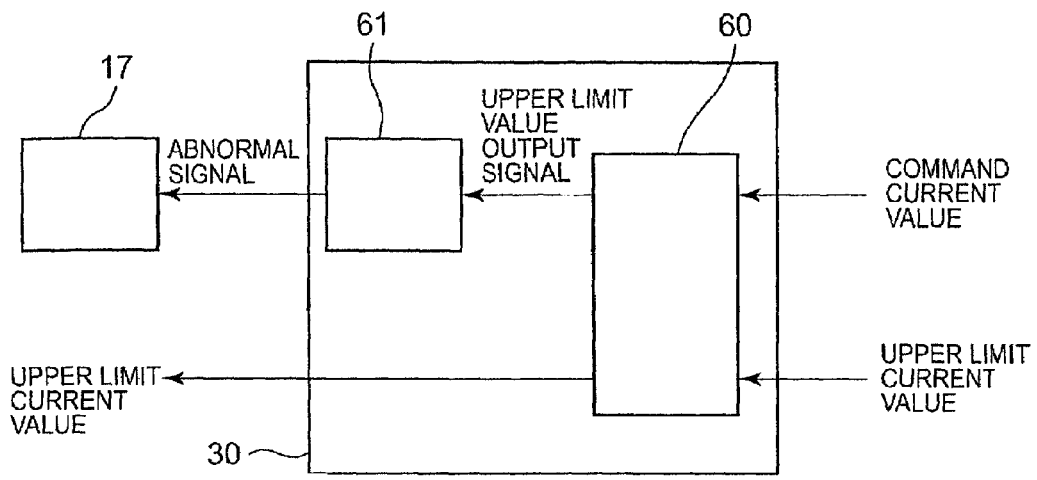
FIG. 14 is a block diagram of a configuration of a comparator in a laser oscillator apparatus, in Embodiment 6 according to the present invention.

FIG. 14 is a schematic diagram of an internal configuration of the second comparator 30 in a laser oscillator apparatus according to the present embodiment; configurations of other components are the same as those of the foregoing embodiments. Referring to FIG. 14, an upper limit current value and a command current value are input to a command current value ascertaining unit 60. As has been described in Embodiment 1, when the command current value is below the upper limit current value, the command current value, as it is, is output to a first comparator 28, which is downstream of the ascertaining unit. Conversely, when the command current value is above the upper limit current value, the upper limit current value is output to the first comparator 28, which is downstream of the ascertaining unit. Then, when the command current value is above the upper limit current value, the upper limit current value is output to the first comparator 28, which is downstream of the ascertaining unit. At the same time, an upper limit output signal is forwarded to an upper limit output time detection timer 61.

Figure 15:
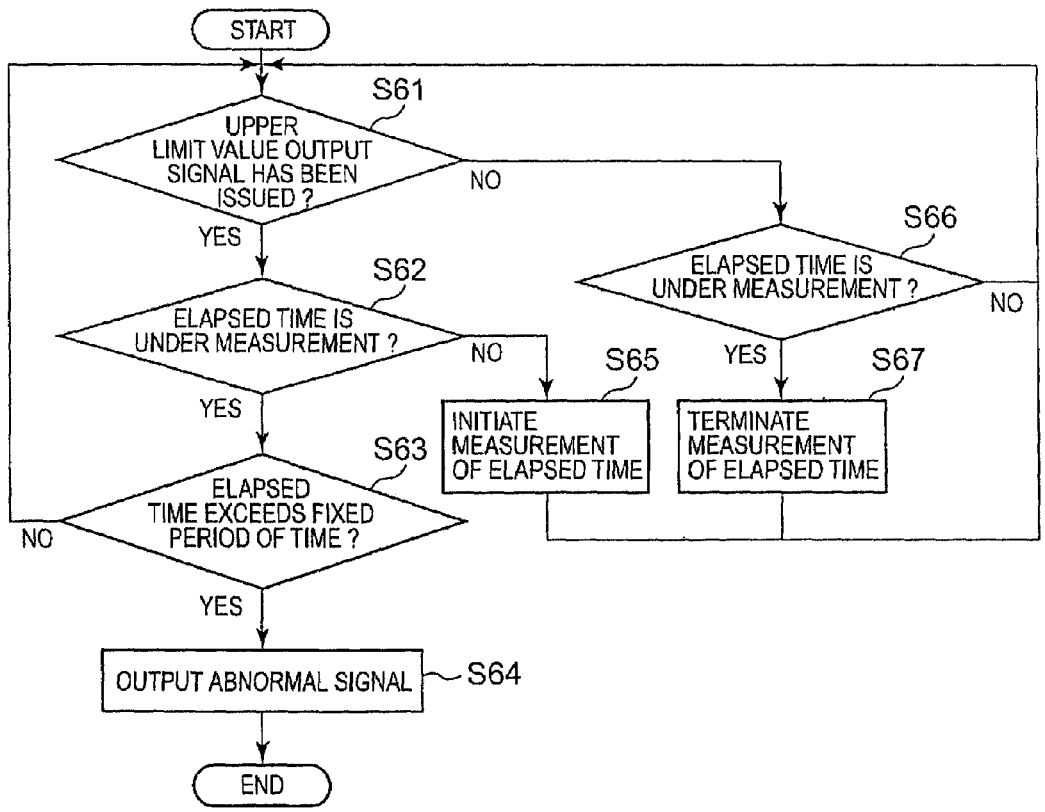
FIG. 15 is a flow-chart illustrating operation of a laser oscillator apparatus, in Embodiment 6 according to the present invention.

FIG. 15 is a flow chart illustrating operation of the second comparator 30. Based on FIG. 15, the operation of the second comparator 30 will be described in a greater detail. The upper limit output time detection timer 61 ascertains whether an upper limit output signal has been output from the command current value ascertaining unit 60 (step S61). If the signal has been output, then the upper limit output time detection timer 61 ascertains whether an elapsed time is under measurement (step S62). If the time is under measurement, the upper limit output time detection timer 61, ascertains whether the elapsed time has passed a predetermined time (step S63). If the elapsed time have passed a predetermined time, then the upper limit output time detection timer 61 delivers an output of an abnormal signal to the controller 17. At step S62, if the upper limit output time detection timer 61 has determined that the time measurement is not executed, then the timer 61 starts measuring the elapsed time (step S65). And then, process flow starting from step S61 is repeated. At step S61, if the signal has not been delivered, then the upper limit output time detection timer 61 ascertains whether an elapsed time is under measurement (step S66). The upper limit output time detection timer 61, if under measurement, terminates the measurement of the elapsed time (step S67). And then, process flow is re-implemented from step S61. At step S66, if it is determined that the time is not measured, then process flow is re-implemented from step S61.

Through these actions, the upper limit output time detection timer 61 measures a time in which the upper limit output signal continues to be turned on; when a fixed period of time or more elapses during which the signal is being turned on, the timer 61 provides an abnormal signal to the controller 17. The controller 17 that has received the abnormal signal may, for instance, reduces a laser output power command value to 0 W, thereby controlling the laser oscillator apparatus so that the oscillation is stopped.

Figures 16A, 16B:
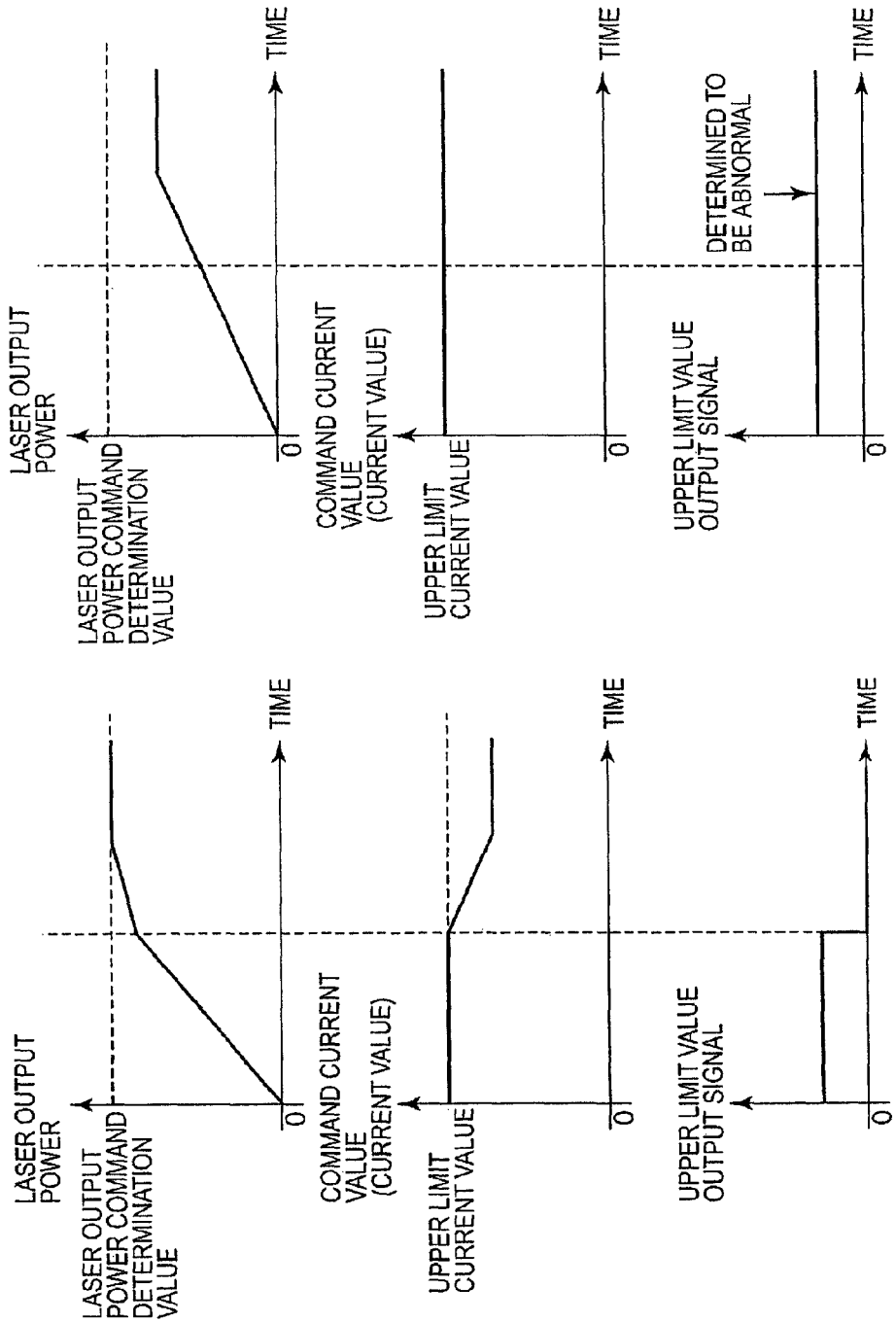
FIG. 16 shows graphs each illustrating a temporal variation in a laser output power and the like of a laser oscillator apparatus, in Embodiment 6 according to the present invention.

Next, temporal variations of a laser output power value, a command current value, and an upper limit output signals, in a laser oscillator apparatus according to the present embodiment, will be described referring to FIG. 16. FIG. 16a is a graph illustrating temporal variations of the laser output power and the like in a normal functioning state; FIG. 16b is a graph in an abnormal state. As shown in FIG. 16a, when the laser oscillator apparatus is normal, a laser output power at its start time is affected by the thermal time constant of a laser oscillator apparatus, the rising time constant of a power monitor and the like, thereby causing the laser oscillator apparatus to react so that the rising edge of the laser output power lags in response to the current variation. Thus, in a case of a fixed laser output power control mode, when the laser output power is started, the current goes up to the upper limit current value. Subsequent to that, as the laser output power nears a desirable value, the command current value decreases progressively, staying at a certain fixed value. Accordingly, at a time when the command current value is below the upper limit current value, the upper limit output signal is not to be generated. Here, referring to a graph of the laser output power in FIG. 16a, the slope of the graph becomes gentle before the laser output power reaches its desirable output. This is because in order to avoid the laser output power from exceeding its desirable value, the current is controlled so as to be reduced when, by calculating a difference between a target value and a present value, the output approaches the target value and the small difference is found therebetween. In contrast, when abnormalities occur in a component such as an optical component, even if, as shown in FIG. 16b, a current of the upper limit current value is supplied, the desired laser output power cannot be obtained. As a result, the current stays long at the upper limit current value. Accordingly, the upper limit current value also continues to be output. If a time while the upper limit current value continues to be output is above a fixed period of time, then an optical component or the like is determined to be abnormal with the system sending a notice to an external apparatus. The fixed period of time may be determined by taking into consideration the thermal time constant of the laser system and the rising time constant of the power monitor, as appropriate, so as to be a time longer than both time constants.

Such a configuration enables the presence or absence of abnormalities of optical components to be ascertained by an abnormal signal. Furthermore, the fact that the controller stops the operation of the laser oscillator apparatus by means of the abnormal signal, can prevent a component such as an optical component from being damaged, for example.

Embodiment 7

In Embodiment 6, duration of time in which the current value stays at the upper limit command current value is measured to ascertain the presence or absence of abnormalities. In the present embodiment, a situation where the laser output power has not reached a desired one after a fixed period of time is determined to be abnormal, and a notice is sent to the external apparatus.

Figure 17:
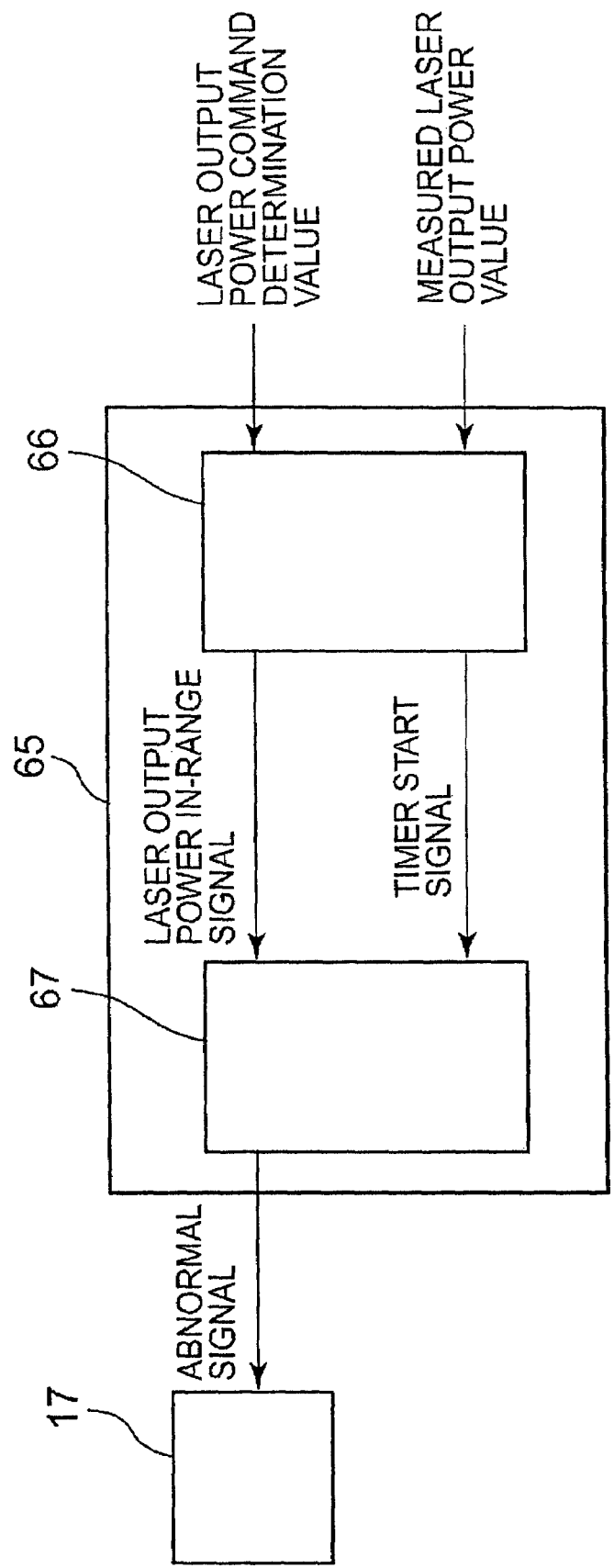
FIG. 17 is a block diagram of a configuration of a laser output power determination unit of a laser oscillator apparatus, in Embodiment 7 according to the present invention.

FIG. 17 is a schematic diagram of an internal configuration of a laser output power determination unit 65 of a laser oscillator apparatus according to the present embodiment, the determination unit being provided inside or outside the current controller 27. Configurations of other components are the same as those of the above-described embodiments. Referring to FIG. 17, a laser output power command determination value and a measured laser output power value are input to the laser output power determination unit 65. The laser output power command determination value and the measured laser output power value that have been input thereto are used to determine whether the measured laser output power value reaches a lower limit value corresponding to the laser output power command determination value using the laser output power ascertaining unit 66 inside the laser output power determination unit 65. The foregoing cooling water and an ambient temperature influences the laser oscillator apparatus to vary the laser output power by on the order of ±2-3%. With this variation taken into consideration, the lower limit value is determined to be a value that is lower by 2-3% than the laser output power command determination value—for instance, 1940 W that is lower by 3% when it is 2000 W. The laser output power ascertaining unit 66, if determining that the laser output power has reached the lower limit value, outputs a laser output power in-range signal. Further, the laser output power ascertaining unit 66 generates an output signal for starting a timer when the laser output power command determination value varies. The laser output power in-range signal and the timer start signal are input to an abnormality detection timer 67 which in turn starts a count of the timer while at the same time the timer start signal is input. After the abnormality detection timer 67 has started a timer count, if the laser output power in-range signal is input after a fixed period of time elapses, the system is determined to be not faulty, thus halting the timer count. On the other hand, if the laser output power in-range signal is not input even after a fixed period of time has elapsed, the system is determined to be faulty; then the abnormality detection timer 67 delivers an output signal for the fault to the controller 17. Here, the fixed period of time may be determined by considering the thermal time constant of the system and the rising time constant of the power monitor, as appropriate, so as to be a time longer than both time constants.

Figures 18A, 18B:
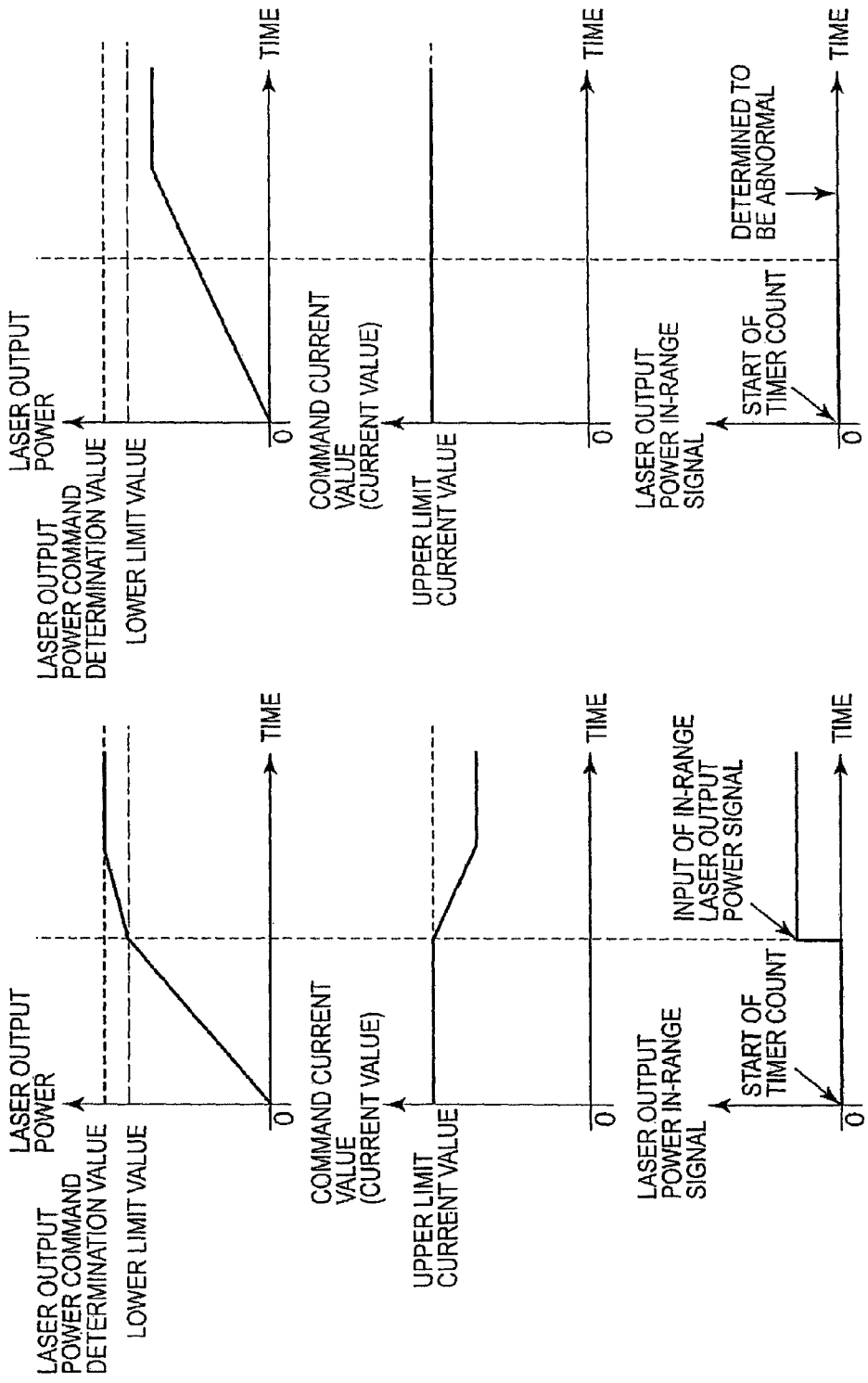
FIG. 18 shows graphs each illustrating a temporal variation in a laser output power and the like of a laser oscillator apparatus, in Embodiment 7 according to the present invention.

Next, temporal variations of a laser output power value, a command current value, and an upper limit output signal, in a laser oscillator apparatus according to the present embodiment, will be described referring to FIG. 18. FIG. 18a is a graph illustrating temporal variations in a laser output power and the like of a laser oscillator apparatus in a normal situation; FIG. 18b is a graph thereof in an abnormal situation. When the apparatus is normal as shown in FIG. 18a, the abnormality detection timer 67 starts a timer count, causing an laser output power in-range signal to be turned on within a fixed period of time. When the apparatus is abnormal as shown in FIG. 18b, the timer starts a timer count, not causing a laser output power in-range signal to be turned on within a fixed period of time. In this way, in situations where a laser output power in-range signal is not turned on within the fixed period of time, as determined to be abnormal, an abnormal signal is sent to an external controller.

This configuration enables the presence or absence of abnormalities of the optical component to be ascertained as with Embodiment 6. In the foregoing description, the system is configured to deliver a signal when the laser output power has reached the lower limit value; conversely, it may also be configured to deliver the signal when the laser output power is below the lower limit value. In this situation, when the timer count is started and the signal is not turned off within a fixed period of time, the apparatus may be determined to be abnormal.

INDUSTRIAL APPLICABILITY

A laser oscillator apparatus according to the present invention is particularly applicable to machining operations in which, as is the case where an optic fiber transfers a laser beam therethrough, a mode variation of a laser beam emitted from the laser oscillator apparatus hardly poses a problem, and to machining operations in which there is a greater opportunity of varying the output power of a laser beam.

What is claimed is:

1. A laser oscillator apparatus that oscillates by supplying a current to pumping means to thereby pump a laser medium, the laser apparatus comprising:
   current measuring means that measures a value of a current supplied to the pumping means;
   laser output power measuring means that measures an output power of a laser beam generated by the laser oscillator apparatus;
   upper limit current value determination means that determines an upper limit current value based on a laser output power command value to be input separately;
   command current value determination means that determines, as a command current value, a value of the current to be supplied to the pumping means, according to a difference between the laser output power command value and the measured laser output power value;
   a comparator that compares the command current value with the upper limit current value, to output the smaller value thereof as a reference current value; and
   current limiting means that compares the reference current value with the measured current value, to limit the value of the current supplied to the pumping means so that the value of the current is controlled to be the reference current value.

2. The laser oscillator apparatus of claim 1, wherein the upper limit current determination means comprises a storage unit that stores an expression of a relationship between the laser output power command value and the upper limit current value, and means that calculates the upper limit current value from the laser output power command value to be input and the relational expression stored in the storage unit.

3. The laser oscillator apparatus of claim 1, wherein the upper limit current determination means comprises a storage unit that stores a relational table describing the relationship between the laser output power command value and the upper limit current value, and means that selects or calculates the upper limit current value from the laser output power command value to be input, and the relational table stored in the storage unit.

4. The laser oscillator apparatus of claim 1, wherein the upper limit current determination means comprises a storage unit that stores an expression of a relationship between a laser output power command value in a reference state of the laser oscillator apparatus and a current value that produces a laser output power corresponding to the laser output power command value, and means that determines the upper limit current value by calculating a current value from the laser output power command value to be input and the relational expression stored in the storage unit, to define a predetermined tolerance to the calculated value.

5. The laser oscillator apparatus of claim 1, wherein the upper limit current determination means comprises a storage unit that stores a relational table describing the relationship between a laser output power command value in a reference state of the laser oscillator apparatus and a current value that produce a laser output power corresponding to the laser output power command value, and means that determines an upper limit current value by selecting or calculating a current value from both the laser output power command value to be input and the relational table stored in the storage unit, to define a predetermined tolerance to the selected or calculated value.

6. The laser oscillator apparatus of claim 1 wherein the comparator comprises means that measures a duration of time while the upper limit current value serves as the reference current value when the comparator compares the command current value with the upper limit current value, and means that generates an abnormal signal when the duration of time is longer than a predetermined time.

7. The laser oscillator apparatus of claim 1 wherein the apparatus further comprises means that measures an accumulated time during which a current is supplied to the pumping means, and means that causes the upper limit current value to increase as the accumulated time increases.

8. The laser oscillator apparatus of claim 1 wherein the apparatus further comprises switching means that switches between the current command determination value to be input separately and the command current value determined by the command current value determination means, to then input either of the values, as the command current value, to the comparator.

9. The laser oscillator apparatus of claim 1 wherein the apparatus further comprises means that measures a duration of time during which a laser output power value does not reach a predetermined one, and means that generates an abnormal signal when the duration of time exceeds a predetermined time.

10. A power supply apparatus for use in a laser oscillator apparatus that compares a desired laser output power command value with a measured output power value of a laser beam emitted from the laser oscillator apparatus, and that provides a feed-back control of a current to be supplied to pumping means that pumps a laser medium so that a laser output power corresponding to the laser output power command value is obtained, the power supply apparatus comprising:
   current measuring means that measures a value of the current supplied to the pumping means;
   upper limit current value determination means that determines an upper limit current value based on a laser output power command value that is to be input separately;
   command current value determination means that determines, as a command current value, a value of the current to be supplied to the pumping means, according to a difference between the laser output power command value and the measured output power value of the laser beam;
   a comparator that compares the command current value with the upper limit current value, to output the smaller value thereof as a reference current value; and
   current limiting means that compares the reference current value with the measured current value, to limit a value of the current supplied to the pumping means so that the value of the current is controlled to be the reference current value.

11. A method of controlling a laser oscillator apparatus that emits a laser beam by supplying laser-medium-pumping means with a current, the method comprising the steps of:

measuring a value of the current supplied to the pumping means;

measuring an output power of a laser beam to be emitted from a laser oscillator apparatus;

determining an upper limit current value based on a desired laser output power command value;

determining, as a command current value, a value of the current to be supplied to the pumping means, according to a difference between the laser output power command value and the measured output power value of the laser beam;

comparing the command current value with the upper limit current value, to determine the smaller value thereof as a reference current value; and comparing the reference current value and the measured current value, to limit a value of the current supplied to the pumping means so that the value of the current is controlled to be the reference current value.

* * * * *